United States Patent
Wegener

(10) Patent No.: US 9,530,003 B2
(45) Date of Patent: Dec. 27, 2016

(54) COMPUTER SYSTEM AND METHOD OF SECURELY BOOTING A COMPUTER SYSTEM

(71) Applicant: Fujitsu Technology Solutions Intellectual Property GmbH, München (DE)

(72) Inventor: Mario Wegener, Bobingen (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 0 days.

(21) Appl. No.: 14/430,262

(22) PCT Filed: Dec. 17, 2013

(86) PCT No.: PCT/EP2013/076922
§ 371 (c)(1),
(2) Date: Mar. 23, 2015

(87) PCT Pub. No.: WO2014/108280
PCT Pub. Date: Jul. 17, 2014

(65) Prior Publication Data
US 2015/0302203 A1    Oct. 22, 2015

(30) Foreign Application Priority Data
Jan. 10, 2013    (DE) .......... 10 2013 100 230

(51) Int. Cl.
*H04L 29/00* (2006.01)
*G06F 21/57* (2013.01)
*H04L 29/06* (2006.01)

(52) U.S. Cl.
CPC ......... *G06F 21/575* (2013.01); *H04L 63/0457* (2013.01)

(58) Field of Classification Search
CPC .................. H04L 9/00; G06F 12/14
(Continued)

(56) References Cited

U.S. PATENT DOCUMENTS

| | | | |
|---|---|---|---|
| 5,610,981 | A | 3/1997 | Mooney et al. |
| 5,960,084 | A | 9/1999 | Angelo |

(Continued)

FOREIGN PATENT DOCUMENTS

| | | |
|---|---|---|
| JP | 2001-290776 | 10/2001 |
| JP | 2011-129041 | 6/2011 |

(Continued)

OTHER PUBLICATIONS

English translation of a Japanese Office Action dated Aug. 9, 2016 of corresponding Japanese Application No. 2015-552020.

*Primary Examiner* — Brandon Hoffman
*Assistant Examiner* — Michael D Anderson
(74) *Attorney, Agent, or Firm* — DLA Piper LLP (US)

(57) ABSTRACT

A computer system includes a data network connection, a reading device, an input component and a security device, wherein the security device establishes a data network link via the data network connection as the computer system is starting up and said security device further receives access data either via the data network link or via the reading device and the input component, and said security device compares the received access data with a data record stored in a firmware on a memory element and boots the computer system if the comparison was successful.

3 Claims, 3 Drawing Sheets

(58) Field of Classification Search
USPC .......................................................... 713/156
See application file for complete search history.

(56) References Cited

U.S. PATENT DOCUMENTS

| | | | |
|---|---|---|---|
| 6,463,537 B1 | 10/2002 | Tello | |
| 6,978,385 B1 | 12/2005 | Cheston et al. | |
| 7,814,337 B2* | 10/2010 | Lee | G06F 21/79 |
| | | | 713/162 |
| 2002/0029348 A1* | 3/2002 | Du | G06F 21/31 |
| | | | 713/193 |
| 2008/0148046 A1 | 6/2008 | Glancey | |
| 2009/0006859 A1 | 1/2009 | Zimmer et al. | |
| 2011/0154484 A1 | 6/2011 | Shimabe | |
| 2012/0179904 A1* | 7/2012 | Dunn | G06F 21/575 |
| | | | 713/155 |

FOREIGN PATENT DOCUMENTS

| | | |
|---|---|---|
| JP | 2011-527061 | 10/2011 |
| WO | 2007/098642 | 9/2007 |
| WO | 2010/005425 A1 | 1/2010 |

\* cited by examiner

Flow Chart

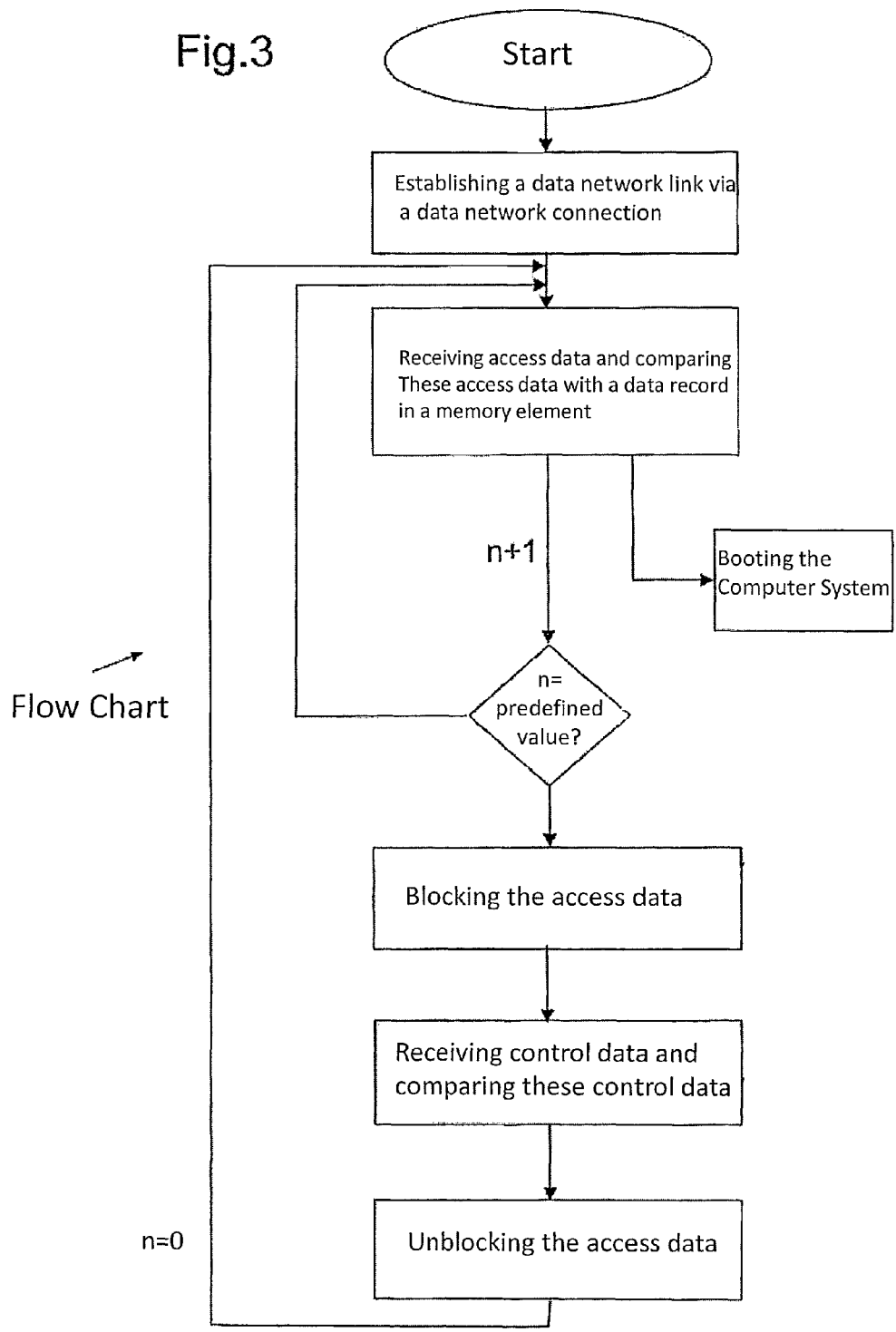

COMPUTER SYSTEM AND METHOD OF SECURELY BOOTING A COMPUTER SYSTEM

TECHNICAL FIELD

This disclosure relates to a computer system comprising a security device adapted to receive access data, compare the access data and boot the computer system if the comparison was successful. In addition, the disclosure relates to two methods of receiving and comparing access data and booting a computer system.

BACKGROUND

Computer systems are known, wherein it is necessary to insert a valid chip card to boot the computer systems. Using a reading device, the computer systems can read out data from the chip card belonging to a user of the computer system. In addition, it is possible to request a password allocated to the user of the chip card. The use of a mechanical component with access data can ensure a high degree of security. If, on the other hand, the computer system is to be booted without the use of a chip card, disproportionately high security deficiencies arise.

It could therefore be helpful to provide a computer system and method that close the gaps in security when operating a computer system of this type.

SUMMARY

I provide a computer system including a data network connection, a reading device, an input component and a security device, wherein the security device establishes a data network link via the data network connection as the computer system is starting up and said security device further receives access data either via the data network link or via the reading device and the input component, and said security device compares the received access data with a data record stored in a firmware on a memory element and boots the computer system if the comparison was successful.

I further provide a method of booting the computer system including establishing a data network link via the data network connection if the computer system is starting up, receiving access data either via the data network link or via the reading device and the input component, comparing the received access data with a data record stored in a firmware on a memory element, and booting the computer system if the comparison was successful.

I yet further provide a method of booting the computer system including establishing a data network link via the data network connection if the computer system is starting up, repeatedly receiving access data either via the data network link or via the reading device and the input component, and comparing the received access data with a data record stored in a firmware on a memory element until the comparison was successful or until a predefined number of repetitions has been reached, blocking the access data if the predefined number of repetitions has been reached in the step of repeatedly receiving and comparing access data or booting the computer system if the comparison of the access data was successful, and comparing control data received via the data network link or via the input component if the access data has been blocked and activating the blocked access data if the comparison of the control data was successful.

BRIEF DESCRIPTION OF THE DRAWINGS

FIG. 3 illustrates a flow chart of a second method of booting a computer system.

LIST OF REFERENCE NUMERALS

Figure 1:
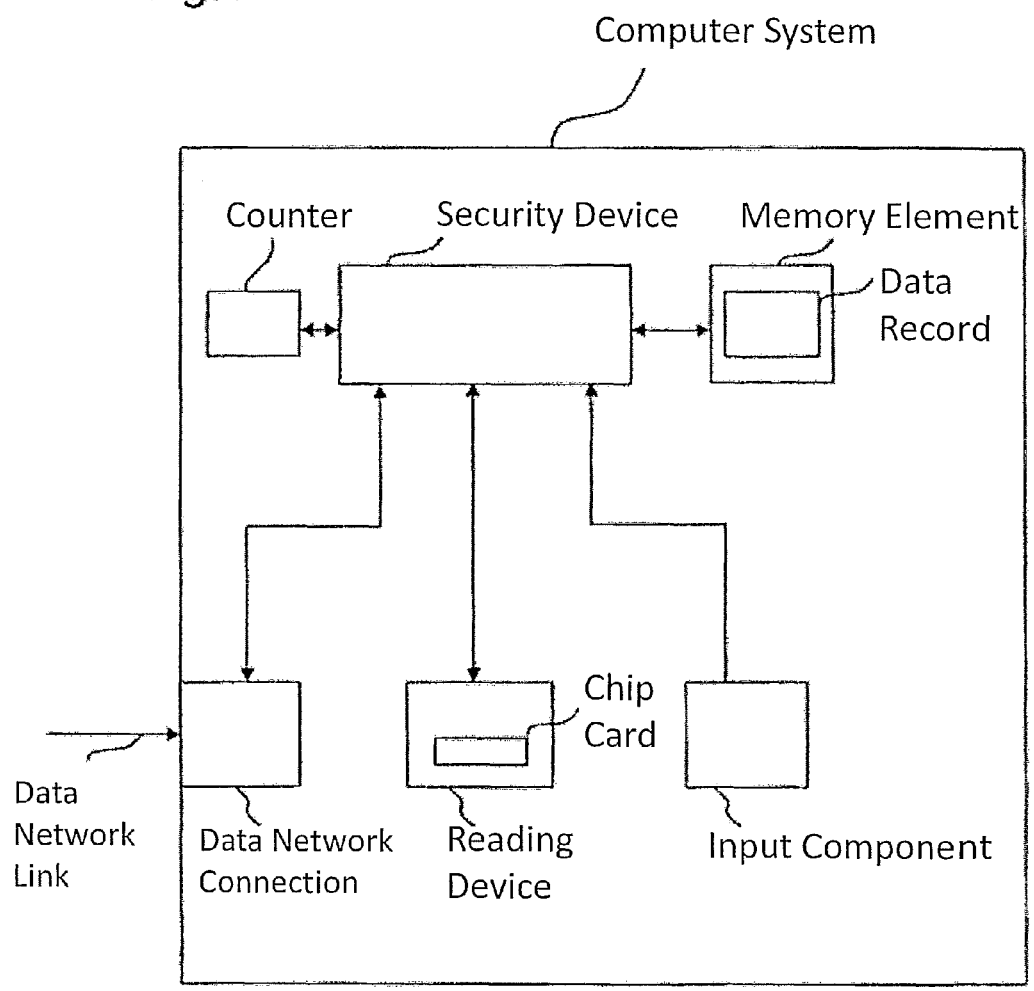
FIG. 1 illustrates a computer system in accordance with one example.

10 Computer system
11 Security device
12 Data network connection
13 Reading device
14 Input component
15 Memory element
16 Data record
17 Data network link
18 Counter
19 Chip card
20, 30 Flow chart
21 to 24 Method steps
31 to 37 Method steps
n Counter value

DETAILED DESCRIPTION

I provide a computer system that comprises a data network connection, a reading device, an input component and a security device. The security device establishes a data network link via the data network connection as the computer system is starting up and the security device further receives access data either via the data network link or via the reading device and the input component. Furthermore, the security device compares the received access data with a data record stored in a firmware in a memory element and boots the computer system if the comparison was successful.

One advantage is that the security device establishes a data network link prior to starting up the computer system. This renders it possible to receive the access data not only via the reading device (by way of example to read out a chip card) and the input component (by way of example a key pad) but rather also via the data network link. This is particularly important if a user makes an error when inputting the access data received by the input component or not all the access data is received via the reading device. If this occurs, a third agent, for example, an administrator, can provide the access data via the data network link and boot the computer system.

Advantageously, the security device may repeat the receiving and the comparing of the access data for a predefined number of times if the comparison is unsuccessful, and to read out via the reading device the predefined number from a chip card.

By virtue of the fact that the receiving and comparing of the access data can be repeated, it is possible for any errors, for example, when inputting a password, to be corrected. The number of repetitions that allow an incorrect input of access data or an incorrect identification of access data can be read out via the chip card.

Advantageously, the security device, once the predefined number of repeated comparisons of the access data has been reached, may block the access data received via the reading device or the data network link and delete the access data received via the input component. Furthermore, the security device receives, either via input component or the data network link, control data dependent upon the access data, compares the control data with a data record stored in the firmware on a memory element, and following a successful comparison of the control data unblocks the blocked access data and regenerates the deleted access data.

One advantage is that even when incorrect access data is repeatedly input the computer system is not completely blocked but rather it is always possible to unlock the computer system. By virtue of receiving the control data via the input component or the data network link, the computer system can be unlocked not only by a user of the computer system but rather also by a user, for example, an administrator, from a remote location.

Advantageously, the security device of the computer system may receive as access data a security code on a chip card via the reading device and an alpha-numeric character string via the input component, or receive as access data via the data network link a combination based on the two sets of data received via the reading device and the input component.

By virtue of the fact that the combination of the access data simulates the two other sets of access data, it is sufficient to transfer one data record rather than having to wait for a further input.

Advantageously, the security device may ensure, following a successful comparison of the access data received via the data network link, that the computer system can be booted repeatedly on successive occasions without receiving access data afresh, wherein the number of booting processes is limited quantitatively or with respect to a predefined time period.

If a user of a computer system does not have an access card to the computer system on hand and, as a consequence, cannot boot the computer system in the proper manner, the user can request that an access code that unlocks and boots the computer system be transmitted to the computer system via a data network link. During the course of the working day, it is therefore possible that the computer system must be rebooted. This would involve the user repeating the process again. It is one advantage that, after requesting an activation code, the user can close down or boot the computer system as desired as long as this occurs within the limited number of times.

Advantageously, the computer system is characterised in that the data received via the data network link may be encrypted. Furthermore, the security device decrypts the received data. This ensures that third parties cannot access the transferred data.

I also provide a method for a computer system having a data network connection, a reading device and an input component comprising the steps:
  establishing a data network link via the data network connection if the computer system is starting up,
  receiving access data either via the data network link or via the reading device and the input component,
  comparing the received access data with a data record stored in a firmware on a memory element, and
  booting the computer system if the comparison was successful.

One advantage is that a data network link is established first and this renders it possible also to receive the access data via the data network link. As a consequence, it is not necessary to provide a user with all the information that is relevant for the system or rather security.

Advantageously, the method is characterized in that the steps of receiving and comparing the access data may be repeated for a predefined number of times in the event of an unsuccessful comparison. Advantageously, the following step is also performed:
  reading out via the reading device from a chip card the predefined number of repetitions of the steps of receiving and comparing said data.

Further advantageously, the step of booting the computer system following a successful comparison of the access data received via the data network link may be performed repeatedly on successive occasions without having to repeat the steps of receiving and comparing said access data, wherein the number of repetitions is limited quantitatively or with respect to a predefined time period.

Further advantageously, in the step of receiving access data, either a security code may be received via the reading device from a chip card or an alphanumeric character string may be received via the input component or a combination based on the security code and the character string is received via the data network link as access data.

I further provide a method for a computer system comprising a data network connection, a reading device and an input component. The method comprises the steps:
  establishing a data network link via the data network connection if the computer system is starting up,
  repeatedly receiving access data either via the data network link or via the reading device and the input component and comparing the received access data with a data record stored in a firmware on a memory element until the comparison was successful or until a predefined number of repetitions has been reached,
  blocking the access data if the predefined number of repetitions has been reached in the step of repeatedly receiving and comparing access data or booting the computer system if the comparison was successful, and
  comparing control data received via the data network link or via the input component if the access data has been blocked and unblocked the blocked access data if the comparison of the control data was successful.

The advantages of this method then become obvious if a user has repeatedly incorrectly input the access data. By virtue of the fact that a data network link is established prior to receiving and comparing the access data, it is possible to receive the control data likewise by direct input via the data network link. As a consequence, it is not necessary for the user to be in possession of the control data. This control data can be input by way of example by an administrator from a remote location.

Advantageously, the method is characterized in that in the step of comparing the control data an alphanumeric character string may be received as the control data.

Further advantageously, the following additional steps may be performed:
  encrypting data prior to transmitting data via the data network link, and
  decrypting the encrypted data that has been received via the data network link.

Advantageously, the second method is characterized in that in the step of blocking the access data in addition the access data received via the input component may be deleted and in the step of comparing the control data the deleted access data may be regenerated if the comparison was successful.

My systems and methods are described in detail hereinunder with the aid of different examples with reference to the attached figures.

FIG. 1 schematically illustrates a computer system 10. A security device 11 is arranged in the computer system 10.

The security device can be a microcontroller provided for this purpose or it can also be integrated in the existing hardware. The security device 11 is provided for the purpose of preventing unauthorized access by persons wishing to access the computer system 10. Various control mechanisms are provided so that authorized users have the opportunity of authenticating themselves. The security device 11 connects to a data network connection 12 so that a data network link 17 can be established by way of example a company network via a so-called "Local Area Network". Furthermore, the security device 11 connects to a reading device 13 that can read out, for example, the data on a chip card 19. The security device 11 furthermore connects to an input component 14, as an example, a key pad. The security device 11 receives access data from the three components 12, 13 and 14. The security device 11 furthermore connects to a memory element 15 in which a data record 16 is stored. The data record 16 is part of a firmware and comprises security-related data required for the purpose of authenticating a user. The computer system 10 comprises a counter 18 connected to the security device 11.

During conventional use of the computer system 10, a user inserts chip card 19 into the reading device 13, starts up the computer system 10 and prior to the computer system booting, the security device 11 displays an input mask by means of which the user with the aid of the key pad can input a password, for example, a so-called "personal identification number" (PIN). The security device 11 is adapted to compare the received code, in the example the PIN number and the data on the chip card 19 received via the reading device 13, with the data record 16 in the memory element 15. If the comparison is successful, the security device 11 unlocks the computer system 10 and boots it.

If, on the other hand, it is not the user who has the chip card 19 but rather a system administrator who wishes to access the computer system 10 from a remote location, then it would be laborious for the system administrator to obtain a chip card 19, go to the computer system 10 and use the chip card 19. In lieu of this, it is more practical to start up the computer system 10 via a data network link 17. However, since the security device 11 only allows users who have the access data on a chip card 19 to access the computer system 10, it is necessary that the administrator of the security device 11 can make this type of data available. The administrator can for this purpose transmit a security code via the data network link 17 and the security code connects via the data network connection 12 to the security device 11 to simulate to the security device 11 a combination of access data on a chip card 19 and a PIN number that has been input. The security device 11 can compare this security code and likewise the combination of the access data from the chip card 19 and the input component 14, with the data record 16 in the memory element 15.

Alternatively, the user may have forgotten chip card 19. In this case, the user can inform the administrator so that the administrator transmits the combination of access data via the data network link 17 to the security device 11 and thus unlocks the computer system 10. It is also necessary for this purpose that the security device 11 has established a data network link 17 even prior to booting the computer system 10 via the data network connection 12.

In the example, the security device 11 repeatedly compares the access data if the comparison was unsuccessful. If, for example, the user inserts chip card 19 into the reading device 13, but subsequently inputs an incorrect PIN number via the input components 14, then the security device 11 recognizes this and provides the user with a further opportunity of inputting via the input component 14 the PIN number that belongs to the chip card 19. In the described example, the security device 11 reads out for this purpose via the reading device 13 from the chip card 19 the predefined maximum number of repetitions that the security device 11 makes available to the user and increases the value of the counter 18 to count the number of repetitions. Consequently, it is possible to define on each individual chip card 19, the number of occasions a user may repeat the input of the password.

The security device 11 is adapted to block the access data that has been read out via the reading device 13 from the chip card 19, or rather to block the access data that has been received via the data network link 17, and to delete the access data, in the example the PIN number, which has been received via the input component 14 if the number of permitted repetitions has been exceeded. By virtue of blocking or rather deleting the access data, a user is refused the opportunity to boot the computer system 10. This is by way of example expedient if an unauthorized user intends to establish which password is correct by making multiple attempts. However, if the legitimate user then wishes to work on the computer system 10 again, the access data can be re-instated by inputting the control data, for example, a Personal Unlock Keys (PUK). The legitimate user can, for example, input this PUK via the input component 14. To obtain the PUK, the legitimate user must first make a telephone call to an administrator and obtain the PUK over the telephone. This can lead to an incorrect PUK possibly being conveyed or to the message from the administrator being misunderstood and an incorrect PUK being input. To avoid this, it is possible using the described computer system 10 to receive this PUK via the data network link 17. Consequently, the administrator can give the user direct access to the computer system 10 without the user having to input the PUK.

In the example, the security device 11 allows repeated successive booting of the computer system 10 following a successful comparison of the access data received via the data network link 17 without receiving the access data afresh. In this manner, a user can then repeatedly boot the computer system 10 without chip card 19 at hand and must request the access data via the data network link 17 from an administrator. The number of booting processes is limited quantitatively or with respect to a predefined time period so that the user receives by way of example access for a day or for 5 booting processes.

In the example, the data to be transmitted via the data network link 17 are first encrypted and the security device 11 decrypts the received data. This ensures a high degree of security and makes it difficult for an unauthorized user to gain access to correct access data.

Figure 2:
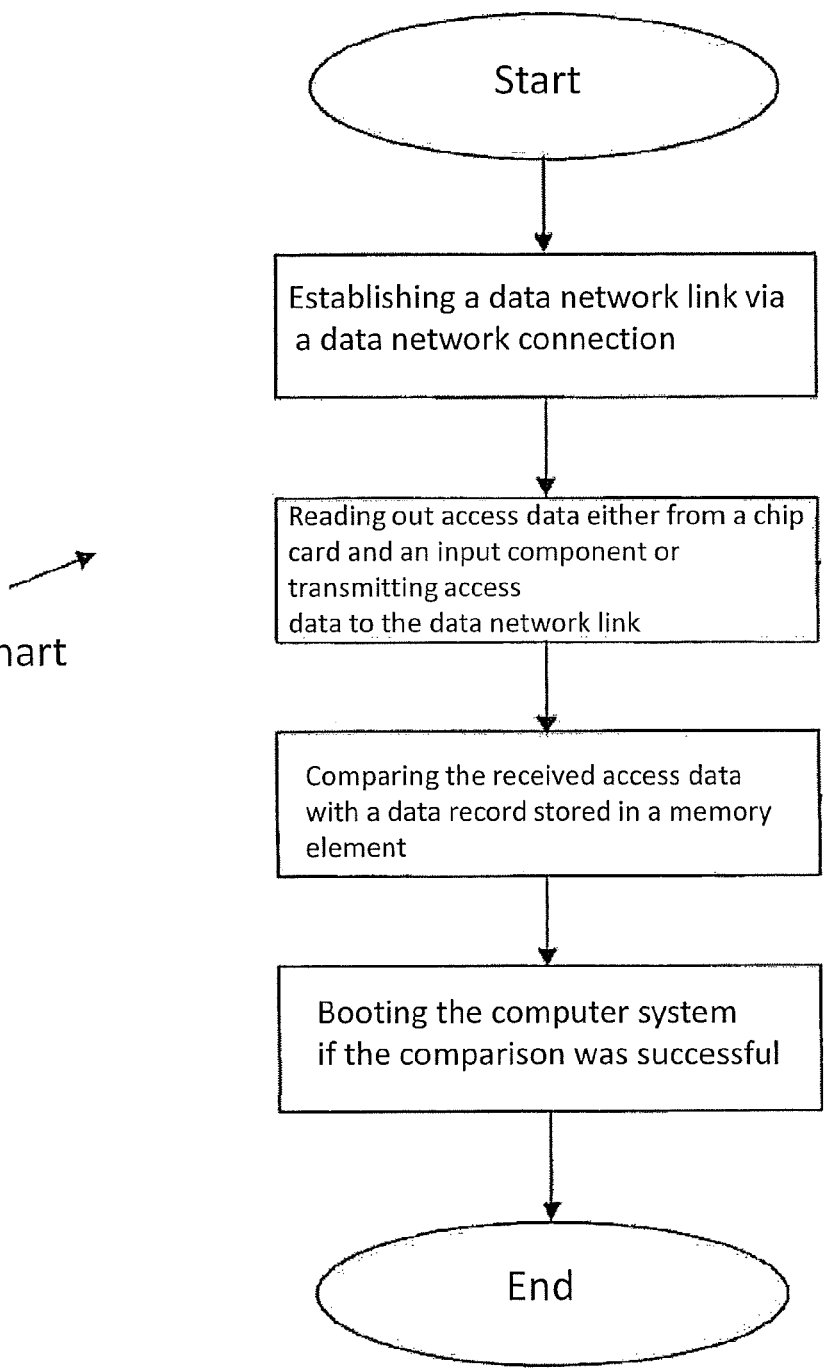
FIG. 2 illustrates a flow chart of a first method of booting a computer system.

The flow chart 20 illustrated in FIG. 2 illustrates the steps of a method of booting a computer system 10. If the computer system 10 is starting up, the step 21 is first performed. In step 21, the security device 11 establishes a data network link 17 via the data network connection 12. Due to the fact that the data network link 17 is established prior to the computer system 10 being booted, access data from an external source can even be received to receive and compare the access data. In step 22, access data is then either read out from a chip card 19 via a reading device 13, and received via the input component 14 or the access data are transmitted to the data network connection 12 via the data network link 17 and the access data is received by the security device 11 via the data network connection 12.

In step 23, the access data that have been received in step 22 are compared by the security device 11 with a data record 16 stored in the memory element 15. It is irrelevant whether the access data received in step 22 has been received via the data network link 17 or the input component 14 and the reading device 13. If the comparison of the access data is successful, the computer system 10 is booted in step 24.

FIG. 3 illustrates a flow chart 30 for booting the computer system 10. If the computer system 10 is starting up, step 31 is first performed, wherein the security device 11 establishes a data network link 17 via the data network connection 12. In step 32, the security device 11 receives access data and compares these access data with a data record 16 in a memory element 15. If the comparison is successful, then the user is authorized to use the computer system and the computer system 10 is booted in step 33. If, on the other hand, the comparison of the access data was unsuccessful, then a counter 18 is activated and the counter value n of the counter 18 is increased by 1. In the query 34, a check is performed as to whether the counter value n of the counter 18 corresponds to a predefined value. If this is not the case, then the user has a further opportunity in step 32 to input the access data and initiate a comparison via the security device 11. If the comparison is successful, the system can be booted in step 33. If, on the other hand, the comparison is once more unsuccessful, then the counter value n of the counter 18 is increased by 1 and a new query is made in step 34 as to whether the counter value n of the counter 18 has reached the predefined value. The predefined value for the maximum repetition of this process is stored in the example on the chip card 19.

If the value by way of example 4 is reached, then the password has been incorrectly input on too many occasions and the access data are blocked in step 35.

To at this point unlock the system again, control data are received and compared in step 36. It is now possible to input the control data in the form of a PUK via the input component 14 or via the data network link 17. If the comparison of the control data is successful, then the access data is blocked in step 37. Following on from step 37, the counter value n of the counter 18 is reset and the user can once more input his access data in step 32.

In one example, not illustrated, in step 35, in addition to blocking the access data, the PIN number input by the user and received via the input component 14 is cancelled. Accordingly, in step 37, in addition to unblocking the access data, the access data that have been received via the input component 14 are regenerated.

In the examples, all data that can be input via the input component 14 are alphanumeric character strings. These data are either input themselves via the input component 14 or are transmitted via the data network link 17.

In one example, not illustrated, the methods comprise in addition to the mentioned steps also the step of encrypting data prior to this data being transmitted via the data network link 17. Accordingly, the methods comprise likewise a step of decrypting the encrypted data.

The invention claimed is:

1. A method of booting a computer system comprising a data network connection, a reading device, an input component and a security device, that receives access data from the data network connection, the reading device and the input component, wherein the security device establishes a data network link via the data network connection as the computer system is starting up and said security device further receives access data either via the data network link or via the reading device and the input component, and said security device compares the received access data with a data record stored in a firmware on a memory element comprising security-related data to authenticate a user and boots the computer system if the comparison was successful,
   wherein the security device repeats the receiving and comparing of the access data for a predefined number of times if the comparison is unsuccessful, and reads out via the reading device the predefined number from a chip card, and
   wherein the security device, once the predefined number of repeated comparisons of the access data has been reached, blocks the access data received via the reading device or the data network link and deletes the access data received via the input component, and said security device receives, either via the input component or the data network link, control data dependent upon the access data, compares the control data with a data record stored in the firmware on a memory element, and following a successful comparison of the control data unblocks the blocked access data and regenerates the deleted access data, the method comprising:
   establishing a data network link via the data network connection if the computer system is starting up,
   repeatedly receiving access data either via the data network link or via the reading device and the input component, and comparing the received access data with a data record stored in a firmware on a memory element until the comparison was successful or until a predefined number of repetitions has been reached,
   blocking the access data if the predefined number of repetitions has been reached in the step of repeatedly receiving and comparing access data or booting the computer system if the comparison of the access data was successful, and
   comparing control data received via the data network link or via the input component if the access data has been blocked and activating the blocked access data if the comparison of the control data was successful.

2. The method according to claim 1, wherein, in the comparing of control data, an alphanumeric character string is received as control data.

3. The method according to claim 1, wherein, in blocking the access data, the access data received via the input component are deleted and, in comparing the control data, the deleted access data are regenerated if the comparison was successful.

* * * * *